United States Patent [19]

Hill et al.

[11] Patent Number: 4,552,298

[45] Date of Patent: Nov. 12, 1985

[54] APPARATUS FOR ATTACHING AN UNDERWATER EXPLOSIVE PAD EYE

[75] Inventors: Terry E. Hill, Thornville; George R. Riley, Grove City; Vonne D. Linse, Columbus; Sheryll C. Green, London, all of Ohio; Paul G. Tack, Witchita Falls, Tex.

[73] Assignee: The United States of America as represented by the Secretary of the Navy, Washington, D.C.

[21] Appl. No.: 490,016

[22] Filed: Apr. 29, 1983

[51] Int. Cl.$^4$ .............................................. B23K 20/08
[52] U.S. Cl. ..................................... 228/2.5; 228/107; 228/109
[58] Field of Search ................ 228/2.5, 107, 108, 109; 114/49, 51, 52, 53

[56] References Cited

U.S. PATENT DOCUMENTS

| | | | |
|---|---|---|---|
| 2,347,491 | 4/1944 | Lente | 114/51 |
| 2,374,134 | 4/1945 | Richard | 114/51 |
| 2,526,973 | 10/1950 | Ryberg | 114/51 |
| 2,536,103 | 1/1951 | Solheim | 114/51 |
| 3,263,323 | 8/1966 | Maher | 228/107 |
| 3,372,996 | 3/1968 | Barrett | 114/53 |
| 3,720,069 | 3/1973 | Lockridge | 405/166 |
| 3,726,460 | 4/1973 | Lemonds | 228/107 |
| 3,822,660 | 7/1974 | Throner | 114/50 |
| 3,848,794 | 11/1974 | Howell | 228/107 X |
| 3,871,315 | 3/1975 | Andersen | 114/51 |
| 3,900,148 | 8/1975 | Chadwick et al. | 228/107 |
| 4,051,797 | 10/1977 | Hausmann | 114/51 |
| 4,272,005 | 6/1981 | Jackson et al. | 228/107 |

OTHER PUBLICATIONS

Adamson, Captain D. M., *Explosive Welding*, Certificated Engineer, Mar. 1976, vol. 219, No. 3, pp. 59–62.
Webster's New International Dictionary of the English Language, Second Edition Unabridged, p. 1751, "Pad Eye".
Webster's Ninth New Collegiate Dictionary, p. 913, "Polystyrene".

*Primary Examiner*—Nicholas P. Godici
*Assistant Examiner*—M. Jordan
*Attorney, Agent, or Firm*—Robert F. Beers; Luther A. Marsh; Michael J. Gonet

[57] ABSTRACT

An apparatus for attaching a pad eye to an underwater ship includes explosives connected to the wings of the pad eye to explosively weld it to the hull of the ship. A water-tight housing holds the pad eye and allows gas to be introduced to drive away all water. Magnets hold the housing to the hull before detonation, a window in the top of the housing allows the diver to observe the entrance of the gas.

12 Claims, 4 Drawing Figures

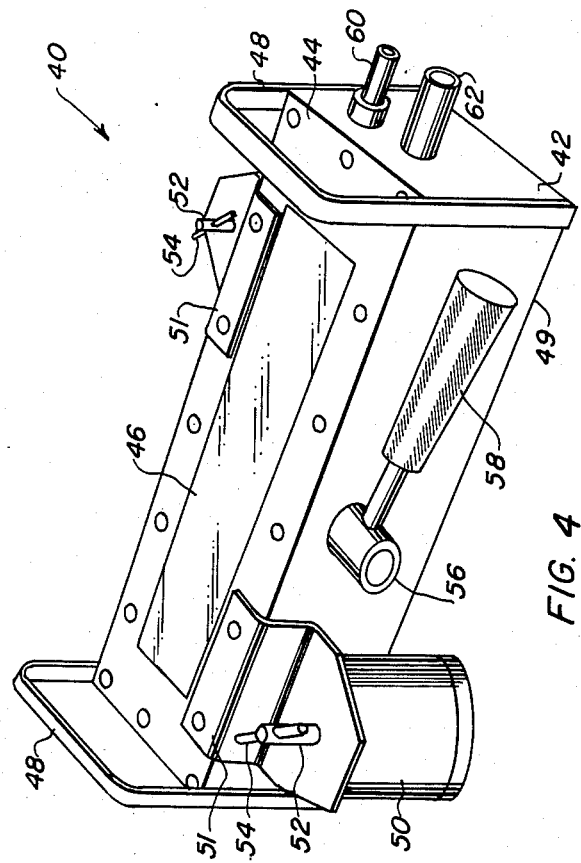
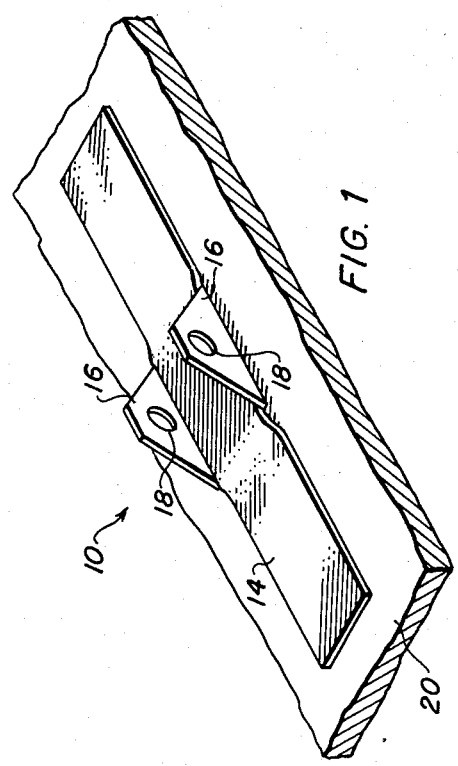
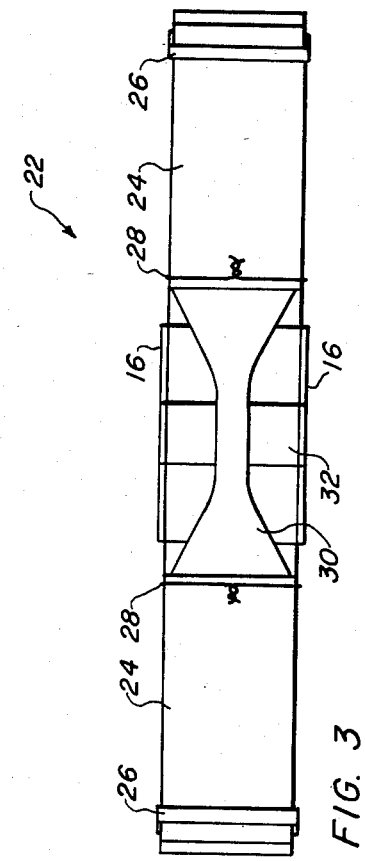
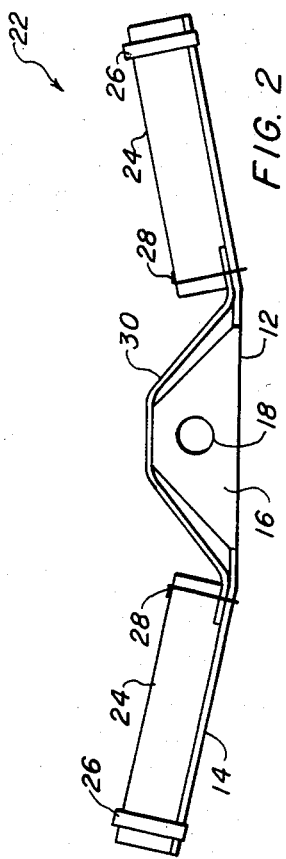

APPARATUS FOR ATTACHING AN UNDERWATER EXPLOSIVE PAD EYE

BACKGROUND OF THE INVENTION

1. Field of the Invention

This invention relates to an apparatus for attaching a pad eye to a surface and more particularly to an apparatus for attaching an explosive pad eye to an underwater surface.

2. Description of the Prior Art

In salvaging sunken ships, it is necessary to connect cables to the hull of the ship in some fashion so that the cables may be used to lift the ship. One simple way to accomplish this is to attach to the hull of the ship a pad eye, that is, a device having a base and some form of an opening in an upstanding member attached to the base. After the base portion is attached to appropriate places on the hull, the cables are placed through the openings and used to raise the sunken ship.

Various methods have been tried to attach the base to the hull. In the case of steel ships, the attachment is difficult since traditional nail or screw techniques do not work. Instead, the traditional approaches include welding or driving explosive rivets into the hull. Unfortunately, these techniques are not completely satisfactory.

In U.S. Pat. No. 4,051,797, a system for salvaging ships is shown which utilizes explosive rivets or bolts to attach cables to the ship. The rivets or bolts are explosively driven into the steel hull. However, the holding power and certainty of such devices is less than that of welded devices.

Another salvaging method uses electrical welding to attach a large plate to the hull of a sunken ship, as shown in U.S. Pat. No. 2,374,134. While this method utilizes the preferred method of attachment, namely welding, it is bulky and difficult to use. The device must be suspended from the salvaging ship and lengthy electrical cabling is used.

Another method utilizes a Thermit reaction to weld a plate to an underwater surface (U.S. Pat. Nos. 3,871,315 and 4,062,485). However, this method is also not entirely satisfactory.

SUMMARY OF THE INVENTION

Accordingly, one object of the present invention is to provide an underwater explosive pad eye which is convenient to use.

Another object of the present invention is to provide an underwater explosive pad eye which is simple and inexpensive.

A further object of the present invention is to provide an apparatus for attaching an explosive pad eye to an underwater surface which is reliable.

A still further object of the present invention is to provide an apparatus for attaching a pad eye to an underwater surface which is convenient to use and simple to operate.

Another object of the present invention is to provide an apparatus which may be easily and safely operated underwater by divers.

Briefly, these and other objects of the invention are achieved by providing a pad eye having two wings which extend in opposite directions from a centrally located pair of eyes formed in upstanding members. Explosives are placed on each of the wings and detonated to cause an explosive weld between each wing and the surface of the hull. A box-like apparatus is used to hold the pad eye and facilitate its operation. Magnets hold the box in position on the hull. Gas is introduced to drive water away from the weld points before the explosives are detonated.

BRIEF DESCRIPTION OF THE DRAWINGS

A more complete appreciation of the invention and many of the attendant features thereof will be readily appreciated as the same becomes better understood by reference to the following detailed description when considered in connection with the accompanying drawings wherein:

FIG. 1 is a perspective view of a pad eye according to the present invention as it is attached to a surface.

FIG. 2 is a side view of a pad eye according to the present invention as it is before being attached.

FIG. 3 is a top view of a pad eye according to the present invention as it is before being attached.

FIG. 4 is a perspective view of an apparatus according to the present invention for applying a pad eye to an underwater surface.

DESCRIPTION OF THE PREFERRED EMBODIMENT

Referring now to the drawings wherein like reference characters designate identical or corresponding parts throughout the several views and more particularly to FIG. 1 where a pad eye, generally indicated by 10, is shown as including a central portion and two wing portions 14 extending to either side. Upturned flanges 16 extend upwardly from either longitudinal edge of the central portion 10 and are formed in the shape of trapezoids. Eyes 18 are provided opposite each other in each of the flanges. The pad eye is welded to a flat surface 20, under the wing portions 14. The central portion remains slightly above the surface due to spacers (not shown) on the bottom of central section 12.

The central portion 12 and wing portions 14 may be formed from a steel strip having a thickness which will support the desired load. For a 1,000 pound load, for example, a thickness of $\frac{1}{8}$ inch may be suitable. The flanges 16 are made of similar material and may be either turned up portions of the same strip or may be separate pieces welded onto the edges of the strip. The flange preferably is trapezoidal in shape, but could assume other shapes, such as rectangular, triangular, etc. The eyes 18 are aligned so that a pin or bolt may easily fit therethrough and used to attach a cable or strap. The bolt may be about $2\frac{1}{2}$ inches long and roughly $\frac{1}{2}$ inch in diameter.

FIG's. 2 and 3 show the same pad eye now generally indicated as 22, before it is attached to surface 20. The wings are bent up at an angle of about 12° to get the best results. The pad eye has explosive charges 24 attached to the wing portions by way of spring clips 26 and twisted copper wires 28, as well as being glued to the wing. The charges 24 are cut away slightly along the lower edge to receive the end of a central explosive initiator 30 having an hourglass shape. An aluminum firing block 32 is placed between the flanges 16 and fills the space therebetween. The block has a hole in alignment with the eyes 18 so that a pin may be placed therein and hold the block in alignment.

FIG. 4 shows a housing, generally indicated by 40, which carries the pad eye and is used to apply it to an underwater surface. The housing is made of sides and ends 42 of aluminum. The bottom of the box is open while the aluminum top 44 contains a large window 46 of plexiglass. The window may vary in size and the top may even be completely of plexiglass for better viewing. The housing measures approximately $4\frac{1}{2} \times 10 \times 14$ inches.

Handles 48, made of strip metal bent into a U-shape, are provided at each end so that the diver operating the device may easily handle it.

A seal 49 is attached to the bottom of the housing by adhesives and insertion into a groove formed at the edge of each side and end. The seal is formed of silicone rubber and prevents water from entering the housing. A break in the seal is provided at one end of the housing to allow water inside the housing to escape.

Magnets 50 are provided on each side of the housing to hold the housing firmly in place once positioned by the diver. The magnets are supported by any suitable bracket 51 which is attached to the housing. Standoff bolts 52 are threaded through the center of the magnets and may extend below the bottom surface of the magnet. A simple handle 54 allows for convenient turning of the bolt.

An arming mechanism 56 is conveniently placed on the side of the housing. In order for the diver to initiate the explosives, a safety mechanism (such as a locking pin or wire; not shown) must be removed and a handle 58 rotated to the armed position. This rotates a shaft inside the housing (not shown) into position for detonation.

Two connections 60, 62 are provided on one end of the housing. Connection 60 is a hose fitting for receiving a hose from a tank of compressed gas. An electrical connection 62 is provided for receiving an electrical cord for energizing the blasting cap.

In operation, the pad eye 22 with explosives is placed inside the housing 40 and carried by a diver to the site of the desired application. The housing is positioned as desired and handles 54 are rotated to retract standoff bolts 52. As the bolts go up, the housing and magnets 50 come into contact with the hull of the ship. Upon contact, the magnets hold the housing in position. At this time also, seal 49 contacts the hull and forms a watertight interface.

A separate tank of compressed gas (not shown) which may be carried on the diver's back is connected to gas connection 60 by way of a hose (at depths over 150 feet, the gas must be light, such as helium). As gas is admitted to the inside of the housing, water is forced out through the opening in the seal at the end of the housing opposite the gas connection. The housing should be placed with at least a slight incline to the horizontal so that the opening is at the lowest point of the housing. When the housing is emptied of all water, the gas supply may be shut off. The diver can determine the amount of water left by looking through the window in the top of the housing.

The electrical connector 62 may then be attached to a conventional reel of electrical cord and the reel carried away to the detonator. When the arming mechanism is set to the arming position, the device is ready for detonation.

When the detonator is actuated, the blasting cap, which is positioned above initiator 30, is detonated and causes the initiator to be likewise detonated. This causes explosive charges 24 to explode, forcing the wings 12 to be forced downwardly with great force. Although a film of water may remain on the welding surface, the copper wire used to hold the charges to the wings breaks through the water film and initiates the welding process.

The firing block between the eyes protects the flanges from damage during the detonation and causes the full force of the explosion to be directed to the wings. A protective strip made of thin metal and bent at an angle to match the angle of the joint between the wing and side of the firing block may be placed over this joint to help deflect the explosive force upwardly.

When the wings are deflected downwardly, they contact the surface of the hull with such force that the wings become welded to the surface. After the firing block is removed, an appropriately sized bolt may be placed through the eyes for attaching a strap or cable.

Additional initiating explosives may be provided to establish the proper timing and force of the explosion. For example, a piece of initiator may be provided along one end of each charge 24 and touching the initiator 30. Similarly, additional initiator pieces may be provided near the blasting cap if necessary.

Devices other than copper wire may be used to hold the charge to the wing. Other types of wire, such as iron, brass, stainless steel or monel may be used. Also, a sharp edge may be machined into the wing of the pad eye for the same purpose.

Numerous additional modifications and variations of the present invention are possible in light of the above teachings. It is therefor to be understood that within the scope of the appended claims the invention may be practiced otherwise than as specifically described herein.

What is claimed is:

1. An apparatus for applying an explosive pad eye to an underwater surface, comprising:
   a housing, said housing including four sides and a top, said top having a clear area through which the inside of the housing may be seen;
   a gas inlet passing through one of said four sides of said housing for admitting compressed gas into said housing and forcing out any water;
   a sealing means mounted on the bottom edge of said four sides of said housing for creating a watertight seal between said housing and said surface, said sealing means being continuous and encircling the entire bottom of the housing except for one opening on the side opposite the side containing the gas inlet for allowing water from inside the housing to escape; and
   an explosive pad eye including two wing portions and explosive charges connected to each of said wing portions;
   wherein said housing is placed on said surface, gas is introduced into said housing through said gas inlet forcing water out of said housing through said opening in said sealing means and said explosive charges are detonated, causing said wing portions to be welded to said surface.

2. An apparatus as in claim 1, further comprising magnets connected to said housing for holding said housing against said surface.

3. An apparatus as in claim 1, further comprising an electrical inlet connected to one side of said housing for connecting said explosive charges to a detonator.

4. An apparatus as in claim 1 wherein said clear area encompasses the entire top.

5. An apparatus as in claim 1, wherein said pad eye further comprises a central portion connecting said two wing portions and two flange members connected to said control portion, said apparatus further comprising a firing block which rests on said central portion and between said flange members.

6. An apparatus as in claim 1 wherein said gas is a light gas and is introduced into the interface between said pad eye and said surface.

7. An apparatus as in claim 6 wherein said gas is hydrogen.

8. An apparatus as in claim 6 wherein said gas is helium.

9. A metallic pad eye for application to a metallic underwater surface, comprising:
   a base member including a central portion and two wing portions, extending in opposite directions from said central portion, which are bent upwardly at an angle of approximately 12 degrees, said base member being formed from a strip of metal;
   a protrusion on the bottom surface of said wing portions adjacent said central portion;
   two flange members connected to opposite edges of said central portion, each of said flange members having an opening arranged opposite the opening of the other flange member; and
   an explosive charge connected to each of said wing portions which, when detonated, force said wing portions downwardly into contact with said underwater surface to form a weld which holds said pad eye to said underwater surface, wherein said protrusion serves to cut through the film of water on the underwater surface upon detonation of said explosives and permits initiation of the weld.

10. A pad eye as in claim 9 further comprising spacers connected to the bottom of said central portion and preventing said central portion from contacting said underwater surface.

11. A pad eye as in claim 9 wherein said protrusion is at least one metal wire which also serves to connect said explosive charge to said wing portion.

12. A pad eye as in claim 11 wherein said protrusion is at the beginning of said bent upwardly wing portion.

* * * * *